US006073426A

United States Patent [19]
Mesmer et al.

[11] Patent Number: 6,073,426
[45] Date of Patent: Jun. 13, 2000

[54] MONITORING AND CONTROLLING SYSTEM TO REGULATE FUNCTIONS OF BIG SQUARE BALERS

[75] Inventors: Denis Mesmer, Bouzonville, France; Martin Hawlas, Harsewinkel, Germany; Ansgar Nonhoff, Coesfeld, Germany; Egbert Scholz, Rheda, Germany

[73] Assignee: Usines Claas France, Metz, France

[21] Appl. No.: 09/072,330

[22] Filed: May 4, 1998

[30] Foreign Application Priority Data

May 5, 1997 [DE] Germany ............................ 197 18 830

[51] Int. Cl.[7] .............................. B65B 11/04; A01F 15/04
[52] U.S. Cl. .............................. 56/10.2 R; 53/504; 53/56; 53/341
[58] Field of Search ................................ 56/13.5, 16.4 R, 56/341, 10.2 R; 100/4, 5, 13, 14, 100; 364/424.07, 146, 188; 74/519, 526; 53/52, 50 R

[56] References Cited

U.S. PATENT DOCUMENTS 5,551,218  9/1996  Henderson et al. ....................... 53/504
5,557,510  9/1996  McIntyre et al. ............... 364/424.07 X
5,896,782  4/1999  McIlwain ................................... 74/519

FOREIGN PATENT DOCUMENTS

| 44 42 479 A1 | 1/1995 | Germany | ......................... A01F 15/08 |
| 44 22 872 A1 | 1/1996 | Germany | ......................... A01F 15/08 |
| 195 38 370 C1 | 10/1996 | Germany | ......................... A01F 15/04 |

Primary Examiner—Robert E. Pezzuto
Attorney, Agent, or Firm—Husch & Eppenberger, LLC; Robert E. Muir

[57] ABSTRACT

A system is provided to monitor and control operational functions in a baler such as a big square baler. Clutches and drive components associated with the system are switchable via a speed regulator. Depending on the switch position of the clutches, additional adjusting devices can be engaged or disengaged. The system automatically swings the cutting knives into and out of the feed channel to preclude clogging of the knife slots in the bottom of the feeding channel. It is advantageous to build such a system with several job processing units sharing the same processing software and, at least in part, identical hardware.

10 Claims, 3 Drawing Sheets

6,073,426

MONITORING AND CONTROLLING SYSTEM TO REGULATE FUNCTIONS OF BIG SQUARE BALERS

BACKGROUND OF THE INVENTION

The present invention relates generally to agricultural machinery and, more particularly, to improvements to balers for harvested crops. The present application pertains specifically to a system to monitor and control the operational functions of a baler.

Big square balers have a pick-up device, a feeding channel with feeding elements and optional cutting elements, a baling chamber with a baling ram for a channel baler, side-limiting walls of the baling chamber, a discharge device, a tying device, an associated operator interface, sensors, an inspection device and a drive means.

Such a baler is disclosed in the German Patent 44 42 479. The systems described in that document refer to the control and regulation of normal working sequences in a baler. Balers are equipped with engaging and disengaging overload clutches, which allow the operator of the baler to maximize the baler's theoretical output potential, without risking idle time due to replacement of shear pins.

It would be advantageous to utilize the overload clutches in a way that prevents clogging of the baler. Furthermore, it would be desirable to integrate such engaging and disengaging overload clutches in a monitoring and controlling system for balers. In addition, there is no means for monitoring other functional elements, such as the header in the baler. However, it should be possible to couple the system with different terminals for other functional elements of the baler.

It is an object of the present invention to provide a monitoring and controlling system which overcomes one of more of above mentioned deficiencies or meets one or more of the desired advantages.

SUMMARY OF THE INVENTION

In accordance with the present invention there is provided a baler for bailing harvested crops and having a pick-up device, a feeding channel with feeding elements, a baling chamber with a baling ram, side limiting walls of the baling chamber, a discharge device, a tying device, an associated operator interface, sensors, an inspection device, a drive means, and a device for monitoring and controlling the operating functions of the big square baler, which shuts down operational elements of the big square baler when marginal speeds of the operational elements of the big square baler are undershot or exceeded.

The monitoring and controlling system monitors the number of revolutions per minute of one or several of the baler's operational elements, which are equipped with engaging and disengaging clutches. If a marginal number of revolutions is undershot or exceeded, these operational devices are disconnected by actuating the clutch.

In addition, if the cutting knives are retracted and automatically extended into the feeding channel at a given interval while the cutting knives are swung-out or while the pick-up device is lifted or lowered, the clogging of the knife slots in the bottom of the feeding channel will be prevented. The monitoring and controlling system, comprises at least two identical job processing units which, to the greatest possible extent, use identical hardware components and the same programmed software, provides several advantages for making necessary repairs to the system. Furthermore, spare parts warehousing of such a system can be improved and optional features such as cutting devices, moisture and weight sensors, etc., can be realized through additional job processing units. Altogether the components can be produced in higher volume and at a lower cost.

BRIEF DESCRIPTION OF THE DRAWINGS

The invention will be described in more detail with reference to the drawings, wherein.

DETAILED DESCRIPTION

Figure 1:
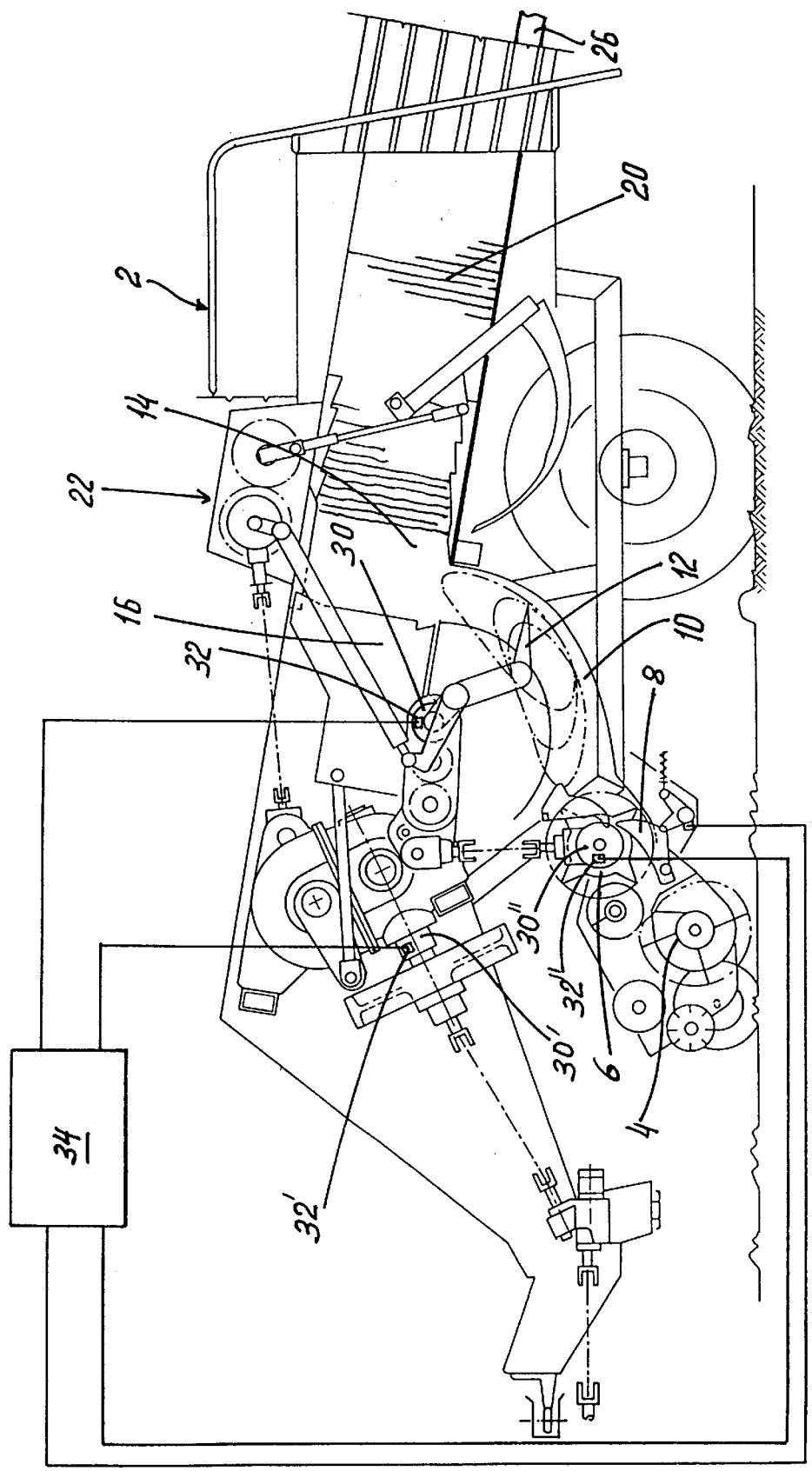
FIG. 1 is a view, partly schematic and partly a side-elevation of a big square baler.

FIG. 1 shows a big square baler 2 having a pick-up device 4 which collects harvested crops from the field, an optional cutting device 6 with knives 8 which cuts the harvested crops, a feeding channel 10 through which the harvested crops are conveyed by a feeder 12, and a baling chamber 14 with a baling ram 16. The newly-arriving crops are pressed by the baling ram 1 6 against a crop bundle 20, pushing the bundle 20 forward in the direction of a discharge slide 26.

When the crop bundle 20 reaches a desired length, a knotter device 22 with a twine-tying needle ties a portion of the crop bundle 20 into a formed bale. The completed bale will be discharged from the baler 2 onto the field via the discharge slide 26. Advantageously all operational elements of the big square baler 2 are driven mechanically from a main gear box 28 and via hydraulic lines from a pump (not shown). Electric motors are another option for driving the operational elements of the big square baler.

The cutting device 6 and the feeder 12, which could also be a rotational feeder with controlled tines, are equipped with clutches 30. The disk fly wheel 32 is also equipped with a clutch 30'. The clutches 30, 30', 30" are individual, automatic self-triggering overload clutches for preventing overloading of the baler's operational elements. In accordance with the preferred embodiment of the present invention, the clutches 30, 30', 30" could be connected without overload protection, provided the speed of the operational elements are monitored to prevent overloading. The number of revolutions of the drive shafts, which are coupled by the clutches 30, 30', 30" are monitored by speed sensors 32, 32', 32". The speed values measured by the sensors 32, 32', 32" are transferred to a monitoring and controlling system 34. There the speed values are evaluated and if the specified marginal number of revolutions is exceeded, one or several of the relevant clutches 30, 30', 30" are disengaged. The monitoring and controlling system 34 transfers a switch signal to the clutch 30 or 30' or 30" which, depending upon the signal, can either interrupt or reinstate the power flow. In addition to the switch signals from the monitoring and controlling system 34, adjusting signals can be transferred to other operational elements of the baler, depending upon the switch position of the clutch 30 or 30' or 30". For example, it is advantageous to simultaneously swing-out the cutting knives 8 from the feeding channel 10, when turning-off the cutting device 6. This reduces the load for the cutting device 6 and prevents clogging of the big square baler 2.

Figure 2:
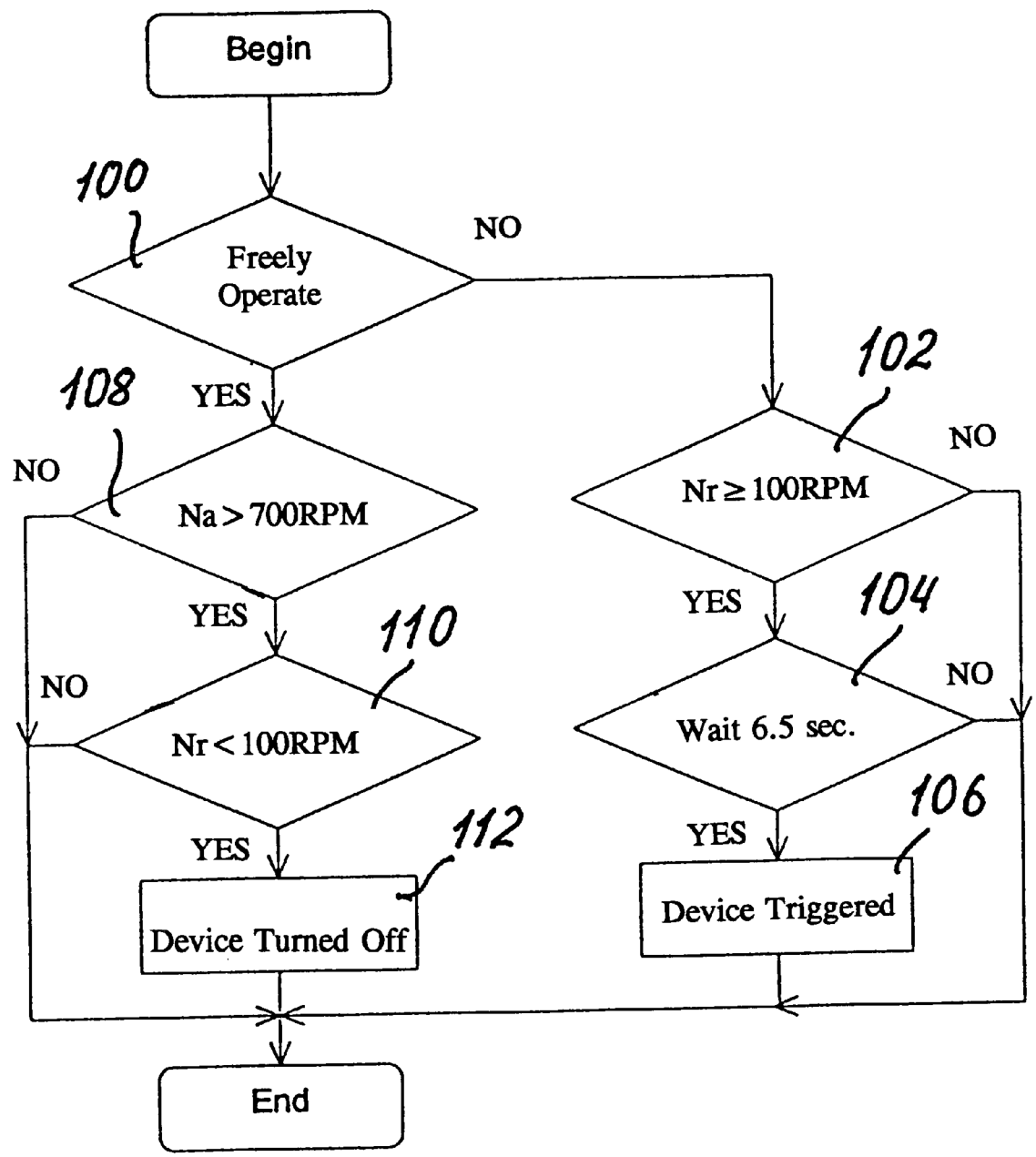
FIG. 2 illustrates a sequence of operation for connection of a speed device for the baler's operational elements.

As an example, FIG. 2 shows a sequence of operation for a monitoring and controlling system for a big square baler's operational functions. The schematic describes the monitoring of the feeder 12. In step 100, the monitoring and controlling system 34 initially checks whether the cutting device 6 can freely operate. If the cutting device 6 is blocked, step 102 checks whether the feeder 12, operating at speed Nr, is operating at a required minimum speed, such as 100 RPM for example. If the feeder 12 is operating at a speed Nr less than 100 RPM, a regulation loop is restarted at step 100. If the feeder is operating at a speed Nr greater than or equal to 100 RPM, a waiting period of 6.5 seconds in step 104 occurs, thereby allowing the feeder 12 to clear the feeding channel 10. Immediately thereafter, the monitoring and controlling system 34 triggers the cutting device 6 in step 106, by switching the corresponding clutch 30 to the auxiliary P.T.O. stub. Next, a new regulation loop begins at step 100. If the monitoring and controlling system recognizes in step 100 that the cutting device 6 can freely operate, step 108 checks whether the speed Na of the P.T.0. shaft—or of a different main drive shaft with corresponding speeds—is at least 700 RPM. If the starting speed is lower than 700 RPM, nothing has to be turned off because the forces are less critical at lower starting speeds. However, if the speed-is higher than 700 RPM, step 110 checks whether the speed Nr of the feeder 12 is over 100 RPM. If the starting speed is higher than 700 RPM and the speed Nr of the feeder is under 100 RPM, there is a risk of overloading or clogging, requiring the shut-down of the cutting device 6. Accordingly, the monitoring and controlling system 34 turns off the cutting device 6 in step 112. With a speed of Nr greater than 100 RPM, normal operating conditions exist and no switching is necessary. Passing through the regulation loop takes only a fraction of a second and is generally repeated several times per second.

The switch functions of the cutting device 6 and the feeder 12 are interrelated, depending upon the starting speed of the P.T.0. shaft. However, the speed regulation can also be adjusted independently from the starting speed of the P.T.O. shaft, or even individually for each working device. The number of revolutions mentioned herein have only been used for the practical example and can be adjusted in the obvious manner by a specialist on an as-needed basis. Likewise, several feeders 12 or several cutting devices 6 can be jointly monitored and controlled as well. It is also very easy to transfer the described functional principle for use in a round baler.

Figure 3:
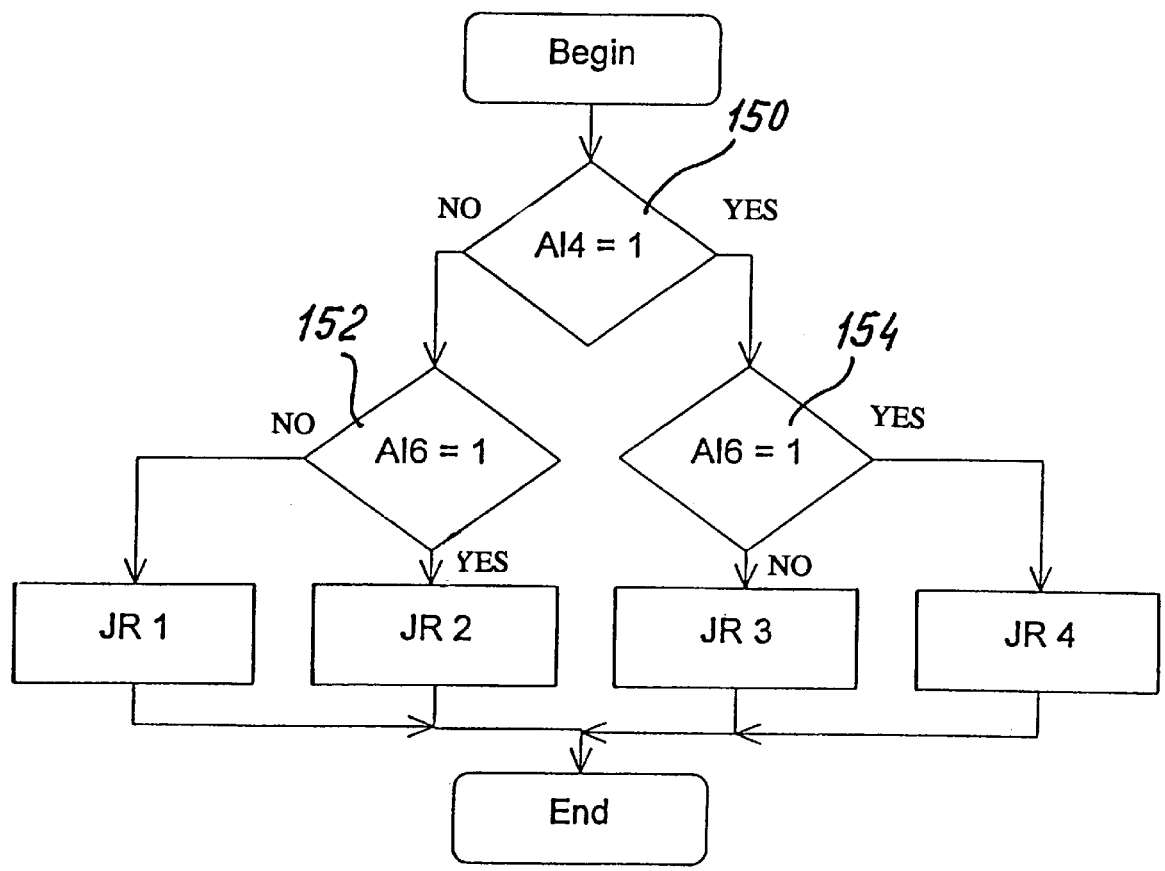
FIG. 3 illustrates a sequence of operation for a construction of the address transfer of the job processing unit of a hardware system.

FIG. 3 shows a sequence of operation for a design of an address transfer of the job processing unit of the monitoring and controlling system 34. In this example, the monitoring and controlling system 34 is comprised of at least four job processing units which, to the greatest possible extent, share identical hardware and use the same programming software. Based on this design, production cost advantages can be gained due to much higher production numbers and fewer subject numbers for spare parts. The hardware wiring of the individual job processing units with each other makes it possible to determine which of the job processing units 1 through 4 becomes the main job processing unit. While starting up the system, the main job processing unit starts the operational routine shown in FIG. 3 and distributes the individual tasks of the job processing unit. The main job processing unit distributes the operational tasks or functions of the baler based upon its polling the two inputs A14 and A16 to ascertain whether a current is present. Step 150 checks whether a current is present at input A14. If no current is present, step 152 has to check whether a current is present at input A16. If again no current is present, the job processing unit 1 receives the function JR1. However, if a current is present in step A16, this job processing unit receives the function JR2. Correspondingly, the functions JR3 and JR4 are distributed between steps 150 and 154. By polling the current, an operational task distribution of these otherwise potentially similar job processing units can be carried out.

Other objects, features and advantages will be apparent to those skilled in the art. While preferred embodiments of the present invention have been illustrated and described, this has been by way of illustration and the invention should not be limited except as required by the scope of the appended claims.

We claim:

1. In a baler for bailing harvested crops and having a pick-up device, a feeding channel with feeding elements, a baling chamber with a baling ram for a channel baler, side limiting walls of the baling chamber, a discharge device, a tying device, an associated operator interface, sensors, an inspection device and drive means; the improvement comprising:

a system for monitoring and controlling the operating functions of the baler and operative for automatically shutting down operational elements of the baler when a marginal speed of at least one of the operational elements is outside a preselected operating range;

an operating element sensor for monitoring the speed of said one operational element and feeding the speed to the monitoring and controlling system;

a clutch associated with said one operational element of the baler; and means controlled by the monitoring and controlling system for deactivating the clutch when the speed is outside the preselected operating range.

2. A baler according to claim 1, including means for activating the clutch.

3. A baler according to claim 1, including a drive shaft which is speed-controlled, and wherein the monitoring and controlling function depends upon the starting speed of the shaft.

4. A baler according to claim 1, including adjusting devices, and wherein the monitoring and controlling system controls the adjusting devices, depending upon the switch position of the clutch.

5. A baler as set forth in claim 1, wherein the system for monitoring and controlling the operating functions of the baler comprises processing software, a plurality of job processing units which share the same processing software and, at least in part, identical hardware.

6. A baler as set forth in claim 5, including wire polling for determining the functions of the job processing units.

7. In a baler for harvesting crops and having a pick-up device, a feeding channel with feeding elements and cutting knives cooperating with knife slots located in the feeding channel, a baling chamber with a baling ram, side limiting walls of the baling chamber, a discharge device, a tying device, an associated operator interface, sensors, an inspection device and drive means; the improvement comprising:

a monitoring and controlling system operative when the pick-up device is being lifted or lowered for retracting the cutting knives and automatically extending them into and out of the feeding channel in a timed manner to preclude clogging of the knife slots.

8. In a baler for bailing harvested crops and having a pick-up device, a feeding channel with feeding elements, a bailing chamber with a bailing ram, side limiting walls of the baling chamber, a discharge device, a tying device, an associated operator interface, sensors, an inspection device, and drive means; the improvement comprising:

a device for monitoring and automatically controlling the operating functions of the baler and comprising processing software, at least two job processing units which share the same processing software and, at least in part, identical hardware.

9. A baler according to claim 8, wherein the functions of the job processing units are determined via wire polling.

10. A method of monitoring and controlling the operating functions of a baler comprising the steps of:

evaluating the operating status of a first operating element;

reading an operating value from a second, interrelated operating element;

comparing the operating value from the second, interrelated operating element with a preset nominal range; and automatically adjusting the operation of the first operating element as dictated by the comparison of the operating value from the second, interrelated operating element with the preset nominal range.

* * * * *